Oct. 8, 1957        J. R. SMYTH        2,809,227
ELECTROLYTE LEVEL CONTROL
Filed Dec. 9, 1953

INVENTOR
JOHN R. SMYTH
BY
ATTORNEY

United States Patent Office 2,809,227
Patented Oct. 8, 1957

2,809,227

ELECTROLYTE LEVEL CONTROL

John R. Smyth, Westport, Conn., assignor to The Electric Storage Battery Company, a corporation of New Jersey Application December 9, 1953, Serial No. 397,236

2 Claims. (Cl. 136—177)

The present invention relates to storage batteries and more particularly to a device adapted for use with storage battery covers that will indicate the level of the electrolyte at one of two different heights within the cells of storage batteries.

It has been determined in the past that there is a certain optimum relationship between the life of a storage battery on the one hand and the amount and strength (specific gravity) of electrolyte present in the battery on the other hand. Consequently it has been common practice to check the specific gravity of the electrolyte at certain intervals by the use of hydrometers and also to determine the quantity of electrolyte present within the cell by visual inspection. Furthermore, in order to insure that the proper amount of water be added to the cell to produce the desired quantity or strength of electrolyte there have been many devices used to prevent overfilling.

A recent development in this field is that covered by U. S. patent application Serial No. 364,014, filed June 25, 1953 by Leland E. Wells and assigned to the assignee of the present application. The co-pending application relates to a device for automatically adjusting the electrolyte at different levels within a storage battery cell, the lowest point being that which has been previously determined to produce an optimum strength of electrolyte for cold weather performance and the highest level being that which has been determined to produce a weaker electrolyte, and thus a larger quantity of electrolyte, such as is desirable for warm weather performance.

It is an object of the present invention to provide visual means whereby the service station attendant, or other party, servicing the battery can readily determine that the electrolyte is at a level that will result in the optimum strength and quantity of electrolyte within the cell for either warm weather operation or for cold weather operation as may be desired. Such device is relatively simple compared with that set forth in copending application. S. N. 364,014, and is concerned with manual and visual operation rather than automatic limitation of the filling operation as will be hereinafter described.

In the drawing, wherein like numerals are used to indicate like parts;

Figure 2:
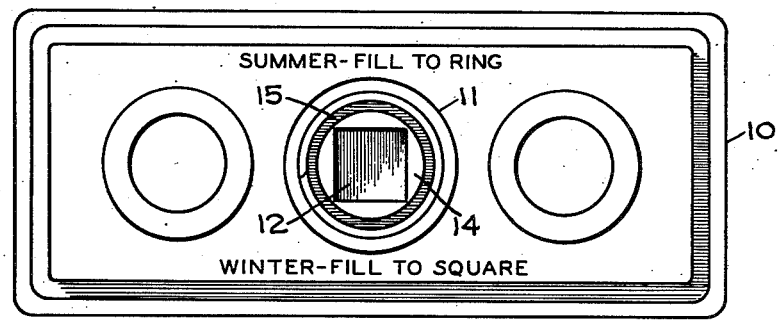
Figure 2 is a sectional view taken along the line 2—2 of Figure 1.
Figure 1:
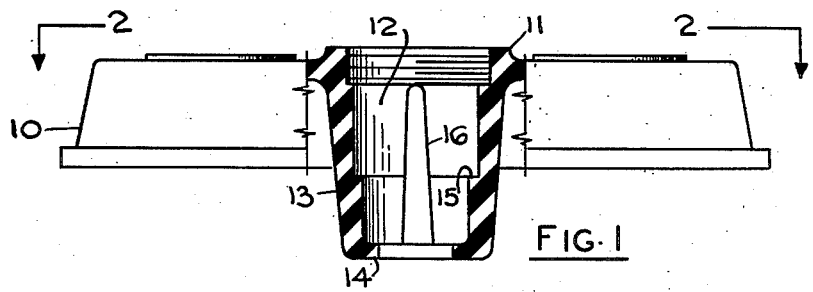
Figure 1 is an elevational view partially in cross section showing one form of the invention.

Referring to the drawing, particularly Figure 1, the numeral 10 indicates a portion of the cover of a storage battery cell (not shown) which is provided with an upwardly extending boss 11 surrounding a filling opening 12 which is further defined by skirt 13 extending downwardly into the cell of the battery. Skirt 13 is provided with shoulders or indicators 14 and 15 formed internally of the skirt at two different levels. As shown in Figure 2 internal shoulder 14 may be so designed as to have a square opening therethrough and shoulder 15 may be so designed as to maintain the circular shape of the filling opening 12 and also to provide a visually different configuration from shoulder 14. Skirt 13 is further provided with an elongated slot, such as 16, extending from the lower extremity of the skirt upwardly to a point immediately below the plane of cover 10 thus permitting venting of the cell at all times and regardless of the electrolyte level.

As described in co-pending application S. N. 364,014 it has been determined that for optimum cold weather performance a strong or high gravity electrolyte to produce the necessary power to overcome motor sluggishness is needed. Conversely, for warm weather performance a weak electrolyte is all that is necessary but such electrolyte should be present in the cell in a greater amount to guard against excessive evaporation and ensure that the plates and separators within the storage battery cell shall remain covered at all times.

If we assume that the storage battery containing the device shown in Figures 1 and 2 is in operation under cold weather conditions and the electrolyte level is at a point somewhat below shoulder 14, when the battery is serviced sufficient water should be added only to bring the electrolyte level up to shoulder 14 shown in the form of a square as in Figure 2. This height has been previously determined to be that which gives the correct strength and amount of electrolyte for cold weather performance. When it is desired that the battery operate properly under warm weather conditions sufficient water should be added to the cell to raise the level of electrolyte to shoulder 15 which is shown in circular form as in Figure 2.

Figure 4:
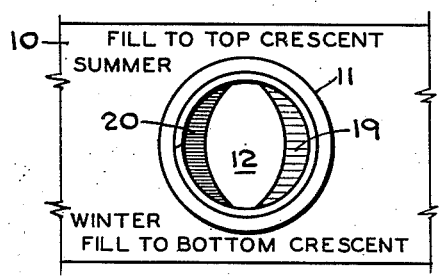
Figure 4 is a plan view taken along the line 4—4 of Figure 3.
Figure 3:
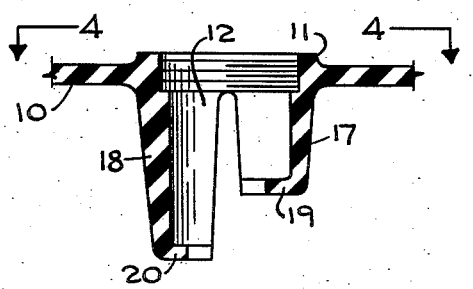
Figure 3 is an elevational view partially in cross section of another form of the invention.

Referring now to Figure 3, it will be seen that a modification of the invention of Figure 1 is shown. Skirt 13 containing slot 16 has become a pair of semi-circular walls 17 and 18, respectively, such walls being slightly spaced apart to permit the necessary venting irrespective of the actual level of the electrolyte. Wall 17, at the lower end, terminates in a shoulder 19, which may be crescent shaped as shown in Figure 4, or any other desired shape, extending inwardly from said wall and being located at the same level as shoulder 15 in Figure 1, i. e., that level which will produce the desired quantity and strength of electrolyte for warm weather performance of the battery. Wall 18 is similar to wall 17 save that inwardly extending shoulder 20 is located at a lower level than shoulder 19, the former being at that level which will produce the desired quantity and strength of electrolyte for cold weather performance of the battery.

Figure 5:
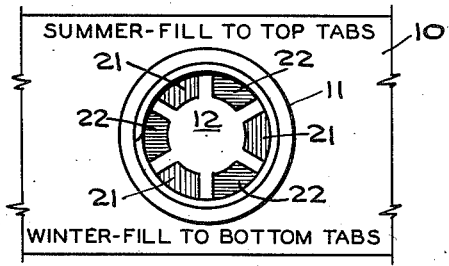
Figure 5 is a plan view of another form of the invention.

Another embodiment of the invention is shown in Figure 5 wherein the desired warm weather performance level is indicated by tabs 21 and the desired cold weather performance level is indicated by tabs 22.

The specific examples here given and the description set forth are exemplary of the invention only. Other forms and variations coming within the scope of the appended claims will be apparent to those skilled in the art.

What is claimed is:

1. A cover for a liquid electrolyte-containing battery, said cover including a substantially vertical tubular wall portion extending downwardly therefrom and provided with a filler opening and a lower edge defining a mouth, means carried by said wall portion below said opening to visually indicate two selected preferred electrolyte levels, said means including two stepped substantially horizontally-disposed rigid inwardly-extending flanges integral with said wall portion below said opening and disposed on opposite sides of said wall portion, each flange having a forward free edge defining a portion of a large central passageway through said wall portion, and at least one vertical vent opening in said wall portion extending above the uppermost flange.

2. A cover for liquid electrolyte-containing battery, said cover including a substantially vertical tubular wall portion extending downwardly therefrom and provided with a filler opening and a lower edge defining a mouth, means carried by said wall portion below said opening to visually indicate two selected preferred electrolyte levels, said means including two stepped substantially horizontally-disposed rigid inwardly-extending flanges integral with said wall portion below said opening, each flange having forward free edges defining a large central passageway through said wall portion, and at least one vertical vent opening in said wall portion extending above the uppermost flange.

References Cited in the file of this patent

UNITED STATES PATENTS

| | | |
|---|---|---|
| 1,938,989 | Woodbrige | Dec. 12, 1933 |
| 2,468,833 | Murphy | May 3, 1949 |
| 2,590,960 | Gray | Apr. 1, 1952 |

FOREIGN PATENTS

| | | |
|---|---|---|
| 412,803 | Great Britain | July 5, 1934 |

OTHER REFERENCES

"Storage Batteries," by Vinal, 1924 ed., page 101.